Dec. 21, 1943.     S. KOLLER     2,337,249
WHEEL DRESSING TOOL
Filed Oct. 27, 1941
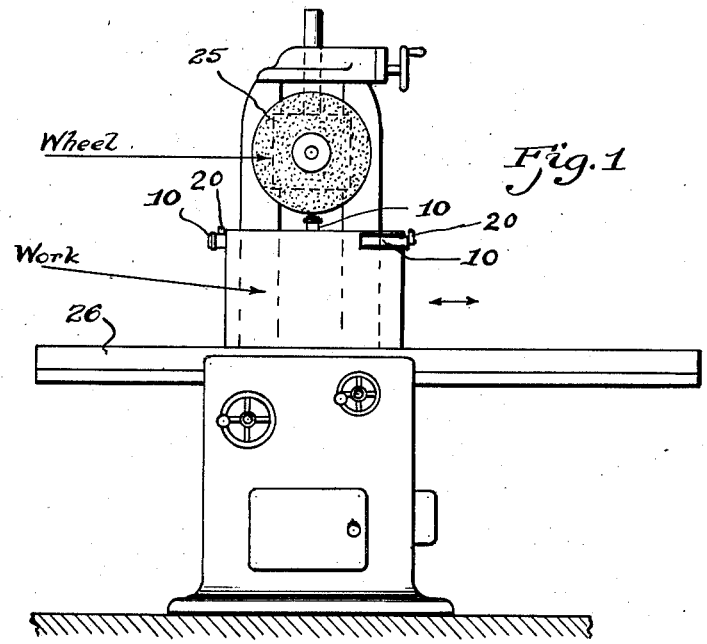
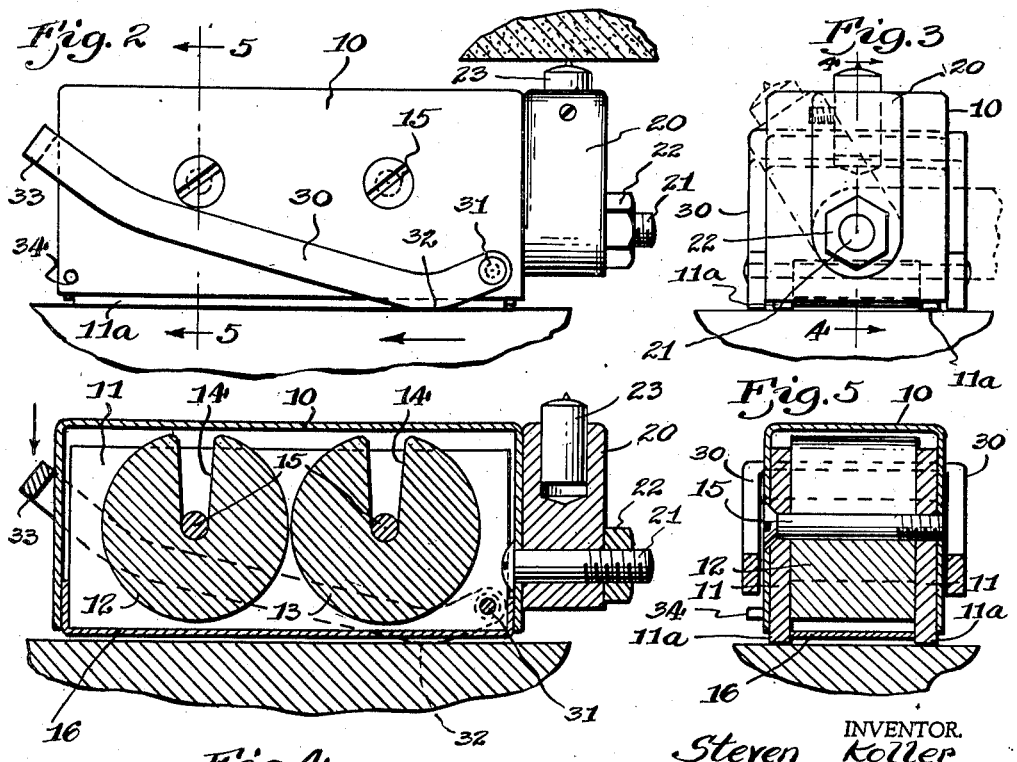
INVENTOR.
Steven Koller
BY Barnes, Kisselle, Laughlin & Raisch
Attorneys.

Patented Dec. 21, 1943

2,337,249

UNITED STATES PATENT OFFICE 2,337,249

WHEEL DRESSING TOOL

Steven Koller, Detroit, Mich.

Application October 27, 1941, Serial No. 416,655

3 Claims. (Cl. 125—11)

This invention relates to a wheel dressing tool and has particularly to do with a means for dressing emery wheels on surface grinders and other machine tools.

At present wheel dressing is accomplished either by hand tools or by other expensive attachments which are difficult to maneuver when a machine is loaded with work. They also interfere with guards on the emery wheels. The present invention contemplates a portable wheel dresser which may be fastened magnetically at any suitable point on a piece of work so that the wheel may be readily dressed without shifting the work on the table. Particularly in surface grinders, it is essential that the wheel dressing tool move with the table in order that the angle of the cutting surface of the wheel will correspond with the movement of the work.

It is a further object of the invention to provide a tool dresser which may be readily attached to the work at any time and readily removed without the necessity of shifting the wheel or the work to any great extent.

It is a further object of the invention to provide a tool dresser which can be magnetically attached and which may be easily cleaned of any steel particles that might collect thereon.

Other objects and features of the invention, having to do with details of construction, will be brought out in the following description and claims.

In the drawing:

Fig. 1 is a front view of a surface grinder illustrating the manner in which the present invention may be utilized.

Figs. 2 and 3 are side and end elevations, respectively, of the tool.

Fig. 4 is a sectional view taken on line 4—4 of Fig. 3.

Fig. 5 is a sectional view taken on line 5—5 of Fig. 2.

With reference to the drawing, the tool holder consists of a casing 10 having an oblong shape and intended in use to be about 1¾ inches by 3¾ inches by 1⅜ inches. This casing is formed of non-magnetic material such as brass and contains two parallel plates 11 of mild steel. These plates are positioned directly adjacent the long sides of the casing and have their lower edges 11a projecting from the casing. Positioned between the plates are two permanent magnets 12 and 13. These magnets are formed of an alloy which is commonly referred to as Alnico. This material is made up of approximately 12% aluminum, 22% nickel, 5% cobalt, and the remainder pure iron. When magnetized, the material is generally referred to as a permanent magnet. The permanent magnets 12 and 13 are formed in substantially cylindrical shape with a radial slot 14 extending to the center. Bolts 15 pass through the magnets and the casing to hold the magnets in position. A plate 16 of non-magnetic material closes the space between the plates 11, leaving exposed only the edges 11a.

At one end of the casing 10 is mounted a bar 20 on a bolt 21, a nut 22 is provided to lock the bar in position. The bar 20 is adapted to receive an insert 23 which consists of a diamond tool dresser. The bar 20 is movable to any of an infinite number of positions around the bolt 21 but has such a length that it will always position the operating point of the tool dresser beyond the contours of the casing 10.

In Fig. 1 a surface grinding machine is shown having a wheel 25 and a table 26. The wheel is movable up and down but, as shown with a relatively large piece of work on the table, is about at the top of its travel. The ordinary type of wheel dresser which is clamped to the table, requires that the work be removed or that the table be shifted and the wheel dropped down to the work, this would result in a loss of time and increase in cost. If the work is disturbed, then there is always the danger that it will be replaced improperly with the presence of a chip or other foreign matter between the work and the table. Using the present invention, the casing or holder 10 may be placed with the edges 11a of plates 11 on the work. There the assembly will be held firmly and the bar 20 may be adjusted to a point where it will contact the wheel. Then by relatively short movement of the table, the wheel can be dressed. If it is impossible to raise the wheel to the point shown, the wheel dressing mechanism may be positioned on the side of the work, as shown in Fig. 1. To facilitate removal of the tool holder from the work I have provided an eccentric mechanism consisting of a U-shaped member 30 pivoted at 31 and shaped so that at points 32 on each side of the casing, the lever will contact the surface of the work. By pressing down on the connecting bar 33 the magnetized plates 11a can be pried away from the work and the assembly easily removed therefrom. A projection 34 is positioned on the casing 10 to prevent the free end of the bar 30 from dropping away from the casing.

It will be seen that when the magnetic tool holder is applied to the work of iron or steel, the magnetic circuit from the permanent magnets will be connected or completed across the plates 11. Either one of the plates alone do not exert a great deal of magnetism, it is only when they are connected that they exert unusual force to hold the tool member in position. Consequently, my tool is distinctly advantageous around a machine shop where chips and filings are attracted to magnetized material. My tool holder can be cleaned of chips by simply wiping the one face or brushing it since very few chips are of sufficient dimension to connect the magnetic forces between the two plates.

It is known to provide magnetic circuits around these permanent magnets but it is my object to provide an extremely compact holding unit and one in which the magnets will add their respective pulls to provide a strong force when a plurality of magnetic inserts are used.

What I claim:

1. A tool assembly comprising a box formed of non-magnetic material, one or more permaflux magnets permanently positioned in said box, relatively thin plates of magnetic material positioned on either side of one of said magnets and projecting from an open face of said box, said plates being spaced apart a distance at least three or four times the width of the plates, non-magnetic means closing the space between the projecting edges of said plates, a diamond dressing member mounted on said box to project therefrom, and a manually operable lever means mounted on said box for exerting pressure between said box and iron surface to overcome the magnetic forces between said plates and said surface.

2. A magnetic tool holder comprising one or more permanent magnets, mild steel plates mounted on each side of said magnets and having spaced edges extending beyond said magnets, a casing of non-magnetic material surrounding said magnets and all but the projecting edges of said plates, and eccentric lever means on said casing manually operable to overcome the magnetic forces between the projecting edges of said plate and an iron or steel surface.

3. A tool assembly including a holder comprising one or more permanent magnets, mild steel plates mounted on each side of said magnets and having spaced edges extending beyond said magnets, a casing of non-magnetic material surrounding said magnets and all but the projecting edges of said plates, eccentric lever means on said casing manually operable to overcome the magnetic forces between the projecting edges of said plate and an iron or steel surface, a wheel dressing insert having a working point, and means for mounting said insert on said casing movable to positions whereby the working point of the insert will project beyond the casing in all positions thereof.

STEVEN KOLLER.